(12) United States Patent
Wentzel et al.

(10) Patent No.: US 7,351,908 B2
(45) Date of Patent: Apr. 1, 2008

(54) ELECTRICAL POWER CABLE ADAPTOR AND METHOD OF USE

(75) Inventors: Carl J. Wentzel, Austin, TX (US); Nga K. Nguyen, Austin, TX (US); William L. Taylor, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/465,683

(22) Filed: Aug. 18, 2006

(65) Prior Publication Data

US 2008/0041605 A1 Feb. 21, 2008

(51) Int. Cl.
*H01B 7/34* (2006.01)
*H02G 15/02* (2006.01)

(52) U.S. Cl. ............... 174/36; 174/73.1; 174/74 R; 174/77 R; 174/84 R

(58) Field of Classification Search ............... 174/36, 174/110 R, 113 R, 110 SC, 120 R, 120 SC
See application file for complete search history.

(56) References Cited

U.S. PATENT DOCUMENTS

| | | | | |
|---|---|---|---|---|
| 3,515,798 A | * | 6/1970 | Sievert | ............... 174/135 |
| 3,808,352 A | * | 4/1974 | Johnson | ............ 174/73.1 |
| 3,816,640 A | * | 6/1974 | Varner | ............ 174/73.1 |
| 3,932,933 A | | 1/1976 | Broad | |
| 4,431,861 A | * | 2/1984 | Clabburn et al. | ...... 174/73.1 |
| 4,506,430 A | * | 3/1985 | Guzay, Jr. | ............... 29/450 |
| 4,551,915 A | * | 11/1985 | Larsson | ............... 29/858 |
| 4,871,599 A | * | 10/1989 | Knorr | ............... 428/36.9 |
| 5,070,597 A | * | 12/1991 | Holt et al. | ............... 29/887 |
| 5,280,136 A | * | 1/1994 | Yaworski et al. | ......... 174/73.1 |
| 5,753,861 A | * | 5/1998 | Hansen et al. | ............... 174/93 |
| 5,801,332 A | | 9/1998 | Berger et al. | |
| 6,015,629 A | | 1/2000 | Heyer et al. | |
| 6,103,975 A | * | 8/2000 | Krabs et al. | ............. 174/74 A |
| 6,171,669 B1 | * | 1/2001 | Vallauri et al. | ............. 428/34.9 |
| 6,245,999 B1 | * | 6/2001 | Costigan et al. | ......... 174/74 A |
| 6,340,794 B1 | * | 1/2002 | Wandmacher et al. | ..... 174/73.1 |
| 6,911,596 B2 | * | 6/2005 | Ohtsubo et al. | ............ 174/36 |
| 2004/0065456 A1 | | 4/2004 | Belli et al. | |
| 2006/0076155 A1 | | 4/2006 | Belli et al. | |

FOREIGN PATENT DOCUMENTS

| | | |
|---|---|---|
| EP | 0 121 986 A1 | 10/1984 |
| EP | 0 121 986 B1 | 10/1984 |
| EP | 0 461 391 A1 | 12/1991 |

OTHER PUBLICATIONS

Cinquemani, Paul L. et al., Pirelli Cable Corporation, Lexington, South Carolina, "Performance of Reduced Wall EPR Insulated Medium Voltage Power Cables Part I: Electrical Characteristics" 0-7803-3522-8/96, 1996 IEEE, pp. 417-424.

* cited by examiner

*Primary Examiner*—William H. Mayo, III

(57) ABSTRACT

An adaptor for controlling electrical stress in an electrical power cable includes a longitudinal insulative member and a semi-conductive member in contacting engagement with an end of the insulative member. A portion of the insulative member overlays a portion of the electrical insulation surrounding the electrical conductor, and a portion of the semi-conductive member overlays a portion of the semi-conductive shield.

20 Claims, 2 Drawing Sheets

ELECTRICAL POWER CABLE ADAPTOR AND METHOD OF USE

BACKGROUND

The present invention relates generally to electrical stress control in electrical power cables, and more particularly to an article and method for controlling electrical stress in a region of high electric field strength associated with electrical power cables and their associated accessories.

As used herein, "high voltage" generally refers to voltages sufficiently high to cause breakdown of the cable insulation at cable shield discontinuities. Without limiting the scope of the present invention, in some implementations, "high voltage" generally refers to voltages of 50 kV or greater, although the present invention is also beneficially used with lower voltages.

A typical high voltage cable includes a central electrical conductor, a semiconducting layer (also referred to herein as a conductor shield) surrounding the electrical conductor, an electrically insulating layer covering the conductor shield, and a semiconducting layer (also referred to herein as an insulation shield) over the insulating layer. In terminating such a cable, it is customary to remove or cut back each successive layer of the cable to expose the layer below. Cutting back the semi-conductive cable shields causes a discontinuity in the cable electric field, resulting in high electric stress at the cut ends of the shields. The high electrical stress can cause electrical discharges to occur, which in turn tends to cause breakdown of the insulating layer of the cable.

The thickness of the cable insulating layer is dependent upon the cable voltage class, with higher voltage cables having a thicker insulating layer. Often, the thickness of the insulating layer could be reduced if the insulation material is made of higher quality (i.e., higher purity). For example, in the United States the insulation thickness of a 69 kV class cable is about 650 mils. A similar cable in Europe, the 72 kV class cable, has an insulation thickness ranging from 400 mils to 470 mils. The reduced insulation thickness provides benefits such as reduced cable size, weight and cost resulting from a decrease in the amount of insulating material used.

Although benefits are provided by a reduced insulating layer thickness, the reduced insulation thickness also forces cable accessories, such as cable terminations, to withstand higher electrical stress at cable shield discontinuities. Unless properly accounted for, the additional electrical stress may lead to failure of the cable and/or cable accessories. In some instances, the additional electrical stress is accommodated by substituting a cable accessory intended for a higher voltage class cable (e.g., using a cable accessory rated for 138 kV with a 110 kV cable having reduced insulation thickness). Although such accessory substitutions work, the cost differential of the higher-rated accessory is often significant. Accordingly, an arrangement that allows the use of cables having reduced insulation thickness with existing cable accessories in the same voltage class is desirable.

SUMMARY OF THE INVENTION

In one aspect, the invention described herein provides an adaptor for controlling electrical stress in an electrical power cable of the type including an inner conductor, a conductor shield surrounding the electrical conductor, a reduced-thickness electrical insulation covering the conductor shield, and a semi-conductive shield surrounding the insulation. In one embodiment, the adaptor comprises a longitudinal insulative member having a first end and a second end; and a semi-conductive member in contacting engagement with the first end of the insulative member; wherein the insulative member is configured to overlay an exposed portion of the reduced-thickness electrical insulation surrounding the cable conductor, and wherein the semi-conductive member is configured to overlay an exposed portion of the cable semi-conductive shield.

In another aspect, the invention described herein provides a termination system for an electrical power cable of the type including an inner conductor, a conductor shield surrounding the electrical conductor, a reduced-thickness electrical insulation covering the conductor shield, and a semi-conductive shield over the insulation. In one embodiment, the termination comprises: a termination configured for installation on a cable having at least a first insulation thickness; and an adaptor configured for installation on a cable having a second insulation thickness, the second insulation thickness less than the first insulation thickness, the adaptor including an insulative member configured to overlay an exposed portion of the cable insulation, and a semi-conductive member in contacting engagement with the insulative member and the cable semi-conductive shield.

In another aspect, the invention described herein provides a method of reducing electrical stress in an electrical power cable accessory. In one embodiment, the method comprises: preparing an electrical power cable of the type including an inner conductor, a conductor shield surrounding the electrical conductor, a reduced-thickness electrical insulation layer covering the conductor shield, and a semi-conductive shield over the insulation layer by removing a predetermined length of the semi-conductive shield to expose a portion of the cable insulation layer and removing a lesser predetermined length of the exposed portion of the cable insulation layer and conductor shield to expose the cable conductor; installing an adaptor over the prepared cable to increase a total effective insulation thickness of the prepared cable; and installing a cable accessory over the adaptor.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DESCRIPTION

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. For example, while the present invention is primarily described in connection with a termination of a cable, it is suitable for employment with high voltage cable joints and other high voltage equipment including electrical bushings and feedthroughs. The following detailed description, therefore, is not to be taken in a limiting sense, and the scope of the present invention is defined by the appended claims.

Figure 1:
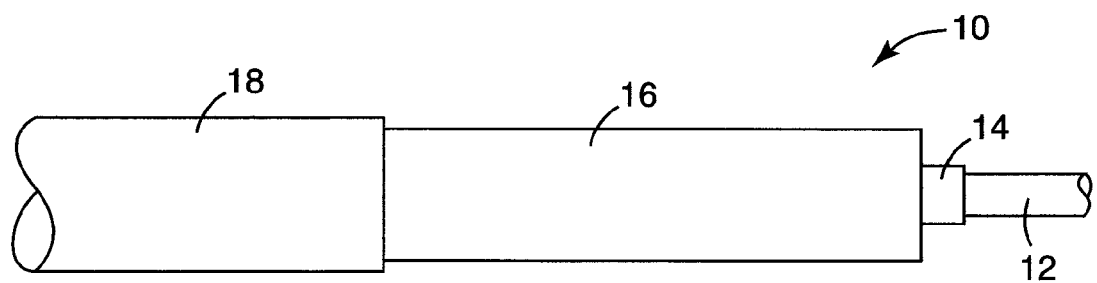
FIG. 1 is an illustration of an electrical power cable prepared for installation of a stress control adaptor according to the invention.

Referring to FIG. 1, an exemplary power cable 10 is illustrated. Exemplary power cable 10 includes a central electrical conductor 12, a semiconducting layer 14 (also referred to herein as conductor shield 14) surrounding electrical conductor 12, a layer of electrical insulation 16 covering conductor shield 14, and a semiconducting layer 18 (also referred to herein as insulation shield 18) over insulation 16. Insulation 16 may comprise a material such as crosslinked polyethylene (XLPE), polyethylene (PE), or ethylene propylene rubber (EPR), or other materials as are known in the art. Additional protective layers (not shown) may additionally be provided over insulation shield 18.

As described herein electrical insulation 16 of cable 10 is understood to have a reduced thickness that, absent supplemental electrical stress controlling measures, requires use of a cable accessory in a higher voltage class than the cable voltage class (e.g., using a cable accessory rated for 138 kV with a 110 kV cable having reduced insulation thickness). Such a cable having reduced-insulation thickness may be referred to herein as a thin-walled cable. In contrast, a cable having electrical insulation sufficiently thick to allow use of a cable accessory in the same voltage class as the cable voltage class, without the use of supplemental electrical stress controlling measures, is referred to herein as a standard cable.

Referring again to FIG. 1, cable 10 is prepared for termination by removing a predetermined length of conductor shield 14, the same predetermined length of insulation 16 covering conductor shield 14, and a greater predetermined length of insulation shield 18 covering the insulation 16. It should be noted that the scale of the drawings is distorted for ease of description. Cutting back insulation shield 18 causes a discontinuity in the electrical field surrounding conductor 12 which results in high electrical stresses at the cut end of insulation shield 18. As described above, the high electrical stress can cause electrical discharge to occur, which in turn may cause breakdown of insulation 16 and eventual failure of the joint.

In one implementation, the electrical stress control of cable 10 having reduced-thickness electrical insulation 16 is supplemented by installing an insulating adaptor over insulation 16 to increase the total effective insulation thickness surrounding conductor 12, and then installing a cable accessory over the adaptor. In one implementation, the total effective insulation thickness is at least as thick as an insulation thickness of a standard cable.

Figure 2A:
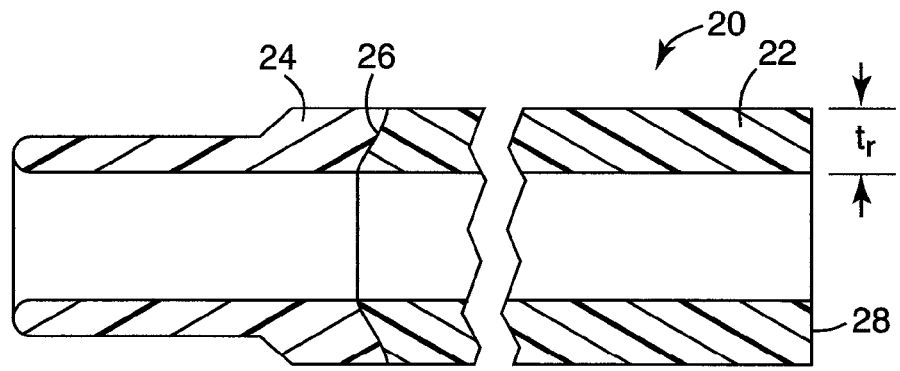
FIG. 2A is a cross-sectional illustration of one embodiment of a stress control adapter according to the invention.
Figure 2B:
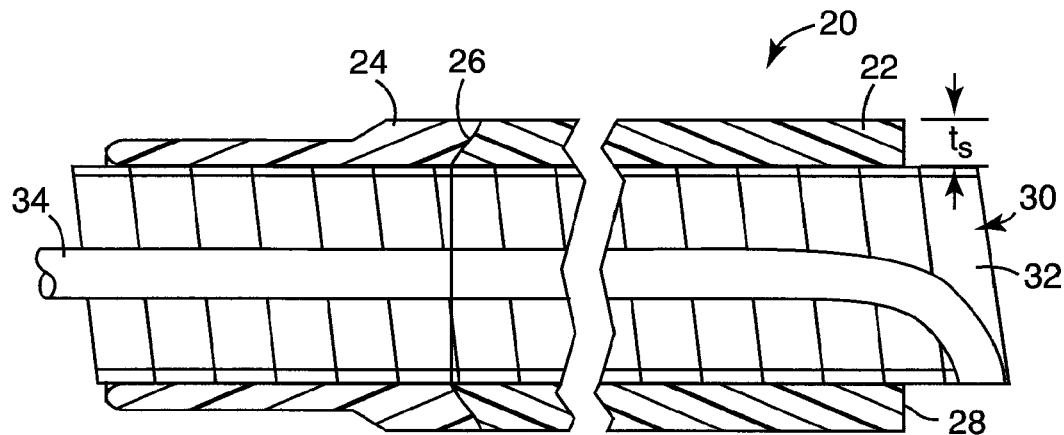
FIG. 2B is a cross-sectional illustration of the stress control adapter of FIG. 2A positioned on a support core according to the invention.
Figure 2C:
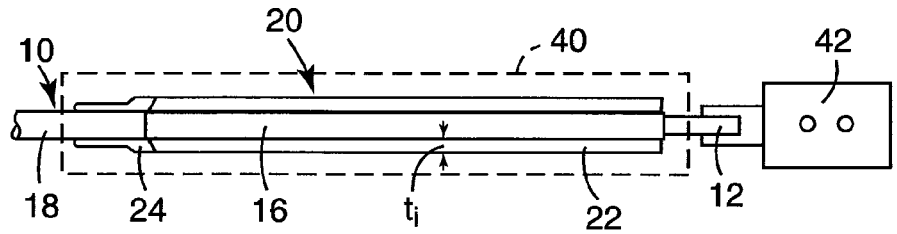
FIG. 2C is a cross-sectional illustration the stress control adapter of FIG. 2A as applied to an electrical power cable according to the invention.

Referring now to FIGS. 2A-2C, an adaptor 20 according to one embodiment of the invention is illustrated. Adaptor 20 includes a longitudinal electrically insulative portion 22 and a semiconductive portion 24. Insulative portion 22 defines a relaxed thickness $t_r$, and has a first end 26 and a second end 28. Semiconductive portion 24 abuts against and is in contacting engagement with first end 26 of insulative portion 22. Ends of the insulative portion 22 and semiconductive portion 24 are formed to avoid sharp corners in high electrical field areas. In the embodiment of FIG. 2A, insulative portion 22 and semiconductive portion 24 are overmolded to form a unitary or one-piece adaptor 20.

In one implementation, as illustrated in FIG. 2B, elastically recoverably adaptor 20 is supported in a radially expanded or pre-stretched condition on a removable rigid support core 30. In this implementation, adaptor 20 may generally be referred to as a cold shrinkable pre-stretched tube. In its radially expanded condition, insulative portion 22 defines a stretched thickness $t_s$ that is less than relaxed thickness $t_r$ of FIG. 2A. The terms "elastically recoverable," "elastically shrinkable" and "cold shrinkable" are used interchangeably to mean that an article is shrinkable at temperatures of about –20° C. to about 50° C. without the addition of heat.

In FIG. 2C, adaptor 20 of FIGS. 2A and 2B is shown installed onto cable 10 and further having cable accessory 40 installed over adaptor 20. Although generically illustrated as a termination, cable accessory 40 may be any type of known cable accessory intended for installation on cable 10, and is not limited to terminations. The exposed conductor 12 is connected to a lug 42 that is crimped onto conductor 12. Insulative portion 22 is configured to overlay and engage the exposed portion of reduced-thickness electrical insulation 16 surrounding cable conductor 12 and thereby increase the total effective cable insulation thickness of thin-walled cable 10 to a thickness that is equal to or greater than the insulation thickness of a standard cable, or alternately to a thickness that reduces electrical stress to a level that the cable and cable accessory combination can withstand. In its installed condition, insulative portion 22 defines an installed thickness $t_i$, that is generally less than relaxed thickness $t_r$ of FIG. 2A and greater than stretched thickness $t_s$ of FIG. 2B. Semiconductive portion 24 is positioned to extend across cut end of insulation shield 18, and is configured to overlay and engage the exposed portion of insulation shield 18 to reestablish the insulation shield over the cable insulation 16 and the adapter insulative portion 22. Adapter 20 utilizes geometric stress relief to re-establish the insulation shield over the composite of cable insulation 16 and adapter insulation 22.

Figure 3A:
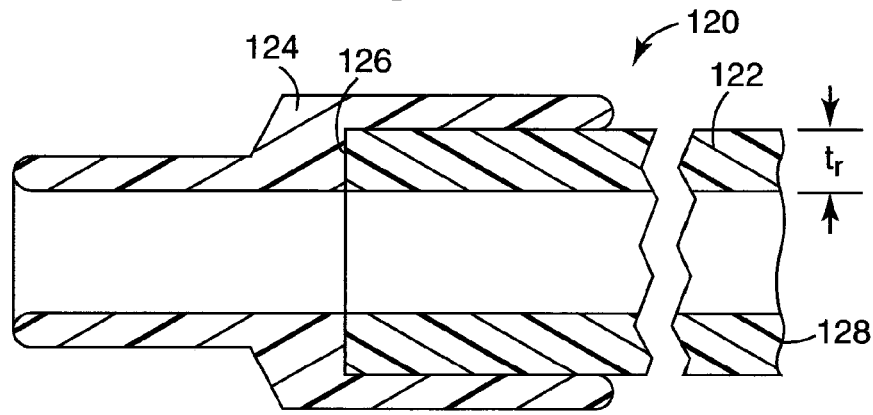
FIG. 3A is a cross-sectional illustration of another embodiment of a stress control adapter according to the invention.
Figure 3B:
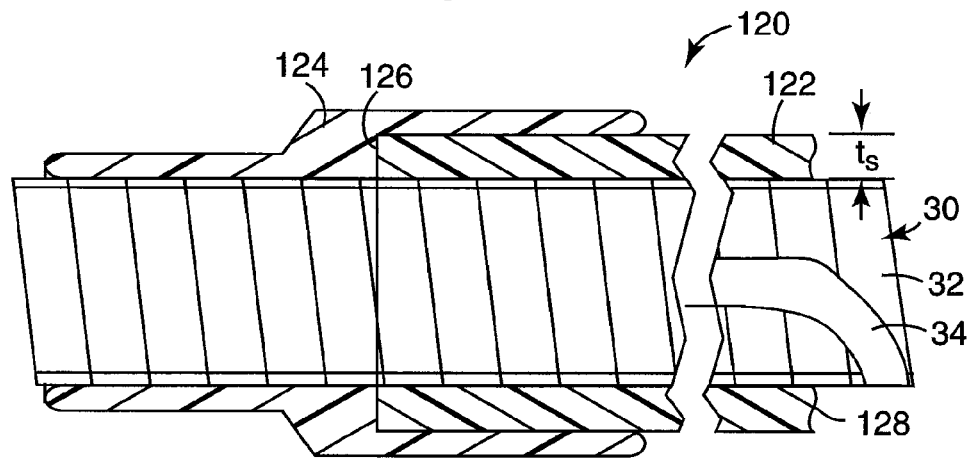
FIG. 3B is a cross-sectional illustration of the stress control adapter of FIG. 3A positioned on a support core according to the invention.
Figure 3C:
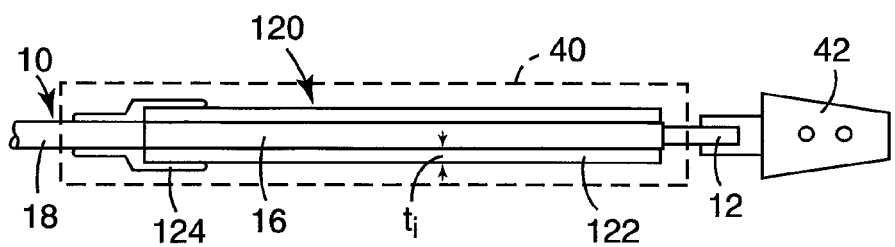
FIG. 3C is a cross-sectional illustration the stress control adapter of FIG. 3A as applied to an electrical power cable according to the invention.

Referring now to FIGS. 3A-3C, an adaptor 120 according to another embodiment of the invention is illustrated. Adaptor 120 includes a longitudinal electrically insulative portion 122 and a semiconductive portion 124. Insulative portion 122 defines a relaxed thickness $t_r$, and has a first end 126 and a second end 128. Semiconductive portion 124 is in contacting engagement with first end 126 of insulative portion 122. Ends of the insulative portion 22 and semiconductive portion 24 are formed to avoid sharp corners in high electrical field areas. In the embodiment of FIGS. 3A-3C, insulative portion 122 and semiconductive portion 124 are separable and form a two-piece adaptor 120. In FIG. 3B, elastically recoverably adaptor 120 is shown supported in a radially expanded or pre-stretched condition on a removable rigid support core 30. In its radially expanded condition, insulative portion 122 defines a stretched thickness t, that is less than relaxed thickness $t_r$ of FIG. 3A.

In FIG. 3C, adaptor 120 is shown installed onto cable 10 and further having cable accessory 40 installed over adaptor 120. Although generically illustrated as a termination, cable accessory 40 may be any type of known cable accessory intended for installation on cable 10, and is not limited to terminations. The exposed conductor 12 is connected to lug 42. Insulative portion 122 is configured to overlay the exposed portion of reduced-thickness electrical insulation 16 surrounding cable conductor 12 and thereby increase the total effective cable insulation thickness of a thin-walled cable 10 to a thickness that is equal to or greater than the insulation thickness of a standard cable, or alternately to a thickness that the cable and cable accessory combination can withstand. In its installed condition, insulative portion 122 defines an installed thickness $t_i$, that is generally less than relaxed thickness $t_r$ of FIG. 3A and greater than stretched thickness $t_s$ of FIG. 3B. Semiconductive portion 124 is positioned to extend across cut end of insulator shield 18, and is configured to overlay and engage both the exposed portion of insulation shield 18 and the first end 126 of insulative portion 122 to re-establish the insulation shield over the cable insulation 16 and the adapter insulative portion 122. Adapter 120 utilizes geometric stress relief to re-establish the insulation shield over the composite of cable insulation 16 and adapter insulation 122.

Although any conventional type of support core 30 may be used in the embodiments of FIGS. 2B and 3B, rigid cylindrical cores in the form of a helically coiled ribbon, e.g., those disclosed in U.S. Pat. Nos. 3,515,798, 4,503,105, 4,871,599 and 4,934,227 are known to be suitable. As seen in FIGS. 2B and 3B, adjacent convolutions of a ribbon 32 forming support core 30 are interconnected in circumferential areas so that core 30 may withstand the inherent radial forces of the stretched adaptor 20. A portion of ribbon 32, i.e., the removal strip 34, is led back through the center of core 30 and can be manually gripped at one end of the core 20. By pulling removal strip 34, the convolutions of core 30 will separate singly. By withdrawing support core 30 from adaptor 20, 120 one helical convolution at a time, adaptor 20, 120 is allowed to progressively radially shrink onto cable 10. Manual pulling of removal strip 34 provides fully adequate force to unwind and remove core 30, leaving adaptor 20, 120 tightly affixed to cable 10.

Core 30 may be made from a variety of materials, e.g., polyvinyl chloride, polyethylene terephthalate, cellulose acetate butyrate, and the like. The material of core 30 need merely be a material which is sufficiently rigid to support adaptor 20 in its radially expanded condition, and allow manual removal of the entire core 30, while being flexible enough to permit the required unwinding.

The materials of adaptor 20, 120 have sufficient elasticity to be radially expanded and relaxed to be placed onto cable 10. In one embodiment, the materials of adaptor 20, 120 are silicone elastomers or silicone rubbers. The terms "silicone elastomer" and "silicone rubber" as used herein mean any polyorganosiloxanes. Silicone elastomers or rubbers useful in adaptor 20, 120 include those conductive silicones having minimum tear strengths of at least about 20 N/mm, preferably at least about 30 N/mm, and elongations of at least about 400%, preferably at least about 500%. The silicone may be a liquid silicone or a gum silicone, and may be selected based upon ease of compounding and processing. However, a wide variety of materials may be used so long as they possess the required ability to stretch and recover substantially their original dimensions when support core 30 is removed.

For use in insulative portions 22, 122 of adaptors 20, 120, respectively, suitable silicone elastomers include, but are not limited to, liquid silicones available as Baysilone® LSR series numbered 2030-2040, available from Bayer Corp., Elastosil® LR3013/40 to 3003/50, available from Wacker Silicones Corp., Silastic® 9280-30 to -40 series from Dow Corning, "KE 1950-30 to 195040", available from Shincor Silicones Inc., and "LIM 6030-D1, and 6040-D1", available from General Electric Corp.; as well as gum silicones available as Silastic® M2809 from Dow Corning, Elastosil® 4000/40 through 4000/70 from Wacker Silicones Corporation, Tufel® I SE846, and Tufel® II 94405, available from General Electric, "SVX-14007B", available from Shincor Silicones Inc. and "HVVP AC3537", available from Bayer Corp.

For use in semiconductive portions 24, 124 of adaptors 20, 120, respectively, suitable silicones include, but are not limited to Elastosil® R573/50, available from Wacker Silicones and "KE-3611U", available from Shincor Silicones. In one embodiment, the material forming semiconductive portion 24, 124 has a volume resistivity from about 30 to about 270 ohm-cm, preferably about 150 ohm-cm.

Silicone polymers useful in adaptor 20, 120 may comprise further additives such as pigments or dyes for coloration of the adaptor or a single portion thereof; such pigments include carbon black, pigment Red 101, etc.; reinforcing silica fillers such as gels and aerosol, dispersants, flame retardants, and the like, so long as the amount and type of additive does not exert an adverse effect on the physical or electrical properties of the composition.

To form insulative portions 22, 122 and semiconductive portions 24, 124 of adaptors 20, 120, respectively, the silicone composition to be used for each portion 22, 24, 122, 124 is mixed and cured, or vulcanized, at high temperatures. The insulative portions 22, 122 and semiconductive portions 24, 124 may be formed by any suitable technique, such as extrusion or molding. In one embodiment, insulative portions 22, 122 and semiconductive portions 24, 124 are formed by injection molding.

When installed on cable 10 having reduced-thickness insulation 16, adapters 20, 120 reduce the electrical stress that is forced into the cable accessory overlaying the adaptor. Adapters 20, 120 thereby allow the use of standard cable accessories on a cable that is designed to operate with greatly increased electrical stress.

In one exemplary implementation, adaptor 20 is used in combination with a 69 kV thin-walled cable having an insulation thickness in the range of 400-470 mils and a 69 kV cable accessory intended for use with a standard cable having insulation thickness of about 650 mils. When installed on cable 10, insulative portion 22 has a thickness sufficient to provide, in combination with the reduced-thickness insulation 16 of the cable 10, a total effective insulation thickness of at least about 650 mils. Thus, in the exemplary implementation, when installed on cable 10, insulative portion 22 has a thickness of at least about 250 mils. The thickness of insulative portion 22 when formed (i.e., in a completely relaxed state) may be greater than the thickness of insulative portion 22 when supported on core 30 or installed on cable 10, due to thinning caused by stretching. Thus, in the exemplary implementation, the thickness of insulative portion 22 when formed may be approximately 450 mils to accommodate thinning caused by stretching. Increased thickness of insulative portion 22 and semiconductive portion 24 may also be desired to increase the compressive force against cable 10, thereby improving the contacting interface between adaptor 20 and cable 10. It will be appreciated that this exemplary implementation is only one of many different implementations having different voltages, thicknesses, etc., and should not be construed as limiting the scope of the invention in any way.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus for controlling electrical stress in an electrical power cable of the type including an electrical conductor, a conductor shield surrounding the electrical conductor, an electrical insulation having a thickness reduced from industry standard thickness covering the conductor shield, and a semi-conductive shield surrounding a portion of the electrical insulation, the apparatus comprising:
    an electrical adaptor which includes:
        a longitudinal insulative member having permittivity less than 8; and
        a semi-conductive member in contacting engagement with an end of the insulative member;
        wherein a portion of the insulative member is configured to overlay a portion of the electrical insulation surrounding the electrical conductor, and wherein a portion of the semi-conductive member is configured to overlay a portion of the semi-conductive shield, and
        wherein the insulative member and semi-conductive members are elastically recoverable.

2. The apparatus of claim 1, wherein the semi-conductive member comprises a semi-conductive silicone rubber.

3. The apparatus of claim 2, further comprising a supporting core, wherein the insulative member and the semi-conductive member are disposed in a radially stretched condition on the supporting core.

4. The apparatus of claim 1, wherein the semi-conductive member overlays the end of the insulative member.

5. The apparatus of claim 1, wherein the semi-conductive member abuts the end of the insulative member.

6. The apparatus of claim 1, wherein the semi-conductive member is configured to extend across a cut end of the cable semi-conductive shield.

7. The apparatus of claim 1, wherein the insulative member has a thickness sufficient to provide, in combination with the electrical insulation of the cable, a total effective insulation thickness that is at least as thick as a standard insulation thickness for a particular voltage class in the electrical utilities industry.

8. The apparatus of claim 7, wherein the insulative member has a thickness sufficient to provide, in combination with the electrical insulation of the cable, a total effective insulation thickness of at least about 650 mils.

9. The apparatus of claim 1, wherein the insulative member and the semi-conductive member are overmolded to form a unitary member.

10. A system for an electrical power cable of the type including an electrical conductor, a conductor shield surrounding the electrical conductor, an electrical insulation having a thickness reduced from industry standard thickness covering the conductor shield, and a semi-conductive shield over a portion of the electrical insulation, the system comprising:
    a cable accessory configured for installation on a cable having at least a first insulation thickness; and
    an adaptor configured for installation on a cable having a second insulation thickness, the second insulation thickness being less than the first insulation thickness, the adaptor comprising:
        a longitudinal insulative member having permittivity less than 8; and
        a semi-conductive member in contacting engagement with an end of the insulative member;
        wherein a portion of the insulative member is configured to overlay a portion of the electrical insulation surrounding the electrical conductor, and wherein a portion of the semi-conductive member is configured to overlay a portion of the semi-conductive shield.

11. The system of claim 10, wherein a thickness of the insulative member and the second insulation thickness, when combined, provide a total insulation thickness that reduces electrical stress to a level the cable and cable accessory can withstand.

12. The system of claim 11, further comprising a semi-conductive member configured to extend between and contact the insulative member and the cable shield.

13. The system of claim 10, wherein the semi-conductive member comprises a semi-conductive silicone rubber.

14. The system of claim 13, wherein the cable accessory is disposed on a radially stretched condition on a first supporting core, and wherein the adaptor is disposed in a radially stretched condition on a second supporting core.

15. The system of claim 10, wherein the cable accessory is configured for installation on a cable having an insulation thickness of at least about 650 mil.

16. A method of reducing electrical stress in an electrical power cable accessory, the method comprising:
    preparing an electrical power cable of the type including an electrical conductor, a conductor shield surrounding the electrical conductor, an electrical insulation layer having a thickness reduced from industry standard thickness covering the conductor shield, and a semi-conductive insulation shield over the insulation layer by removing a predetermined length of the semi-conductive insulation shield to expose a portion of the cable insulation layer and removing a lesser predetermined length of the exposed portion of the cable insulation layer and conductor shield to expose the electrical conductor;
    installing an adaptor over the prepared cable including an insulative member having permittivity less than 8 and a semi-conductive member to increase a total effective insulation thickness of the prepared cable; and
    installing a cable accessory over the adaptor.

17. The method of claim 16, wherein installing an adaptor over the prepared cable to increase a total effective insulation thickness of the prepared cable comprises:
    disposing an insulative member on the exposed portion of the cable insulation; and
    disposing a semi-conductive member in contact with the insulative member and the cable semi-conductive insulation shield.

18. The method of claim 17, wherein the exposed portion of the cable insulation has a thickness less than a minimum thickness, and wherein disposing an insulative member on the exposed portion of the cable insulation increases the total effective insulation thickness to at least a minimum thickness, and further wherein installing a cable accessory over the adaptor comprises installing a cable accessory configured for use with at least the minimum thickness.

19. The method of claim 16, wherein installing the adaptor and installing the cable accessory comprise radially shrinking the adaptor and radially shrinking the cable accessory, respectively.

20. The method of claim 16, wherein radially shrinking the adaptor and radially shrinking the cable accessory include removing supporting cores from the adaptor and the cable accessory, respectively.

* * * * *

UNITED STATES PATENT AND TRADEMARK OFFICE
CERTIFICATE OF CORRECTION

PATENT NO. : 7,351,908 B2  Page 1 of 1
APPLICATION NO. : 11/465683
DATED : April 1, 2008
INVENTOR(S) : Carl J. Wentzel It is certified that error appears in the above-identified patent and that said Letters Patent is hereby corrected as shown below:

Column 3,
Line 32, delete the word "herein" and insert --herein,-- therefor.

Column 4,
Line 17, delete "$t_s$" and insert --$t_s$,-- therefor.

Column 4,
Lines 43-44, delete "reestablish" and insert --re-establish-- therefor.

Column 4,
Line 64, delete "t," and insert --$t_s$,-- therefor.

Column 6,
Line 4, delete "195040"," and insert --1950-40",-- therefor.

Signed and Sealed this

Second Day of September, 2008

JON W. DUDAS
*Director of the United States Patent and Trademark Office*